United States Patent
McCoy et al.

(10) Patent No.: US 10,162,888 B2
(45) Date of Patent: Dec. 25, 2018

(54) SYSTEM AND METHOD FOR AUDIO IDENTIFICATION

(71) Applicant: SONY INTERACTIVE ENTERTAINMENT LLC, San Mateo, CA (US)

(72) Inventors: Charles McCoy, Coronado, CA (US); Prisciliano Flores, Spring Valley, CA (US); True Xiong, San Diego, CA (US); Yuqian Zhao, San Diego, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 162 days.

(21) Appl. No.: 14/311,657

(22) Filed: Jun. 23, 2014

(65) Prior Publication Data
US 2015/0370892 A1    Dec. 24, 2015

(51) Int. Cl.
*G06F 17/30* (2006.01)

(52) U.S. Cl.
CPC .. *G06F 17/30758* (2013.01); *G06F 17/30743* (2013.01)

(58) Field of Classification Search
CPC ........... G06F 17/3074; G06F 17/30743; G06F 17/30864; G06F 17/30758
USPC .................................. 707/705, 736, 758, 769
See application file for complete search history.

(56) References Cited

U.S. PATENT DOCUMENTS

| | | | |
|---|---|---|---|
| 7,623,823 B2 | 11/2009 | Zito et al. | |
| 7,986,913 B2 | 7/2011 | Wang | |
| 8,370,351 B2 | 2/2013 | Kalasapur et al. | |
| 2006/0059277 A1* | 3/2006 | Zito | G06Q 30/02 710/15 |
| 2007/0250534 A1* | 10/2007 | Heikkila | G11B 27/11 |

(Continued)

FOREIGN PATENT DOCUMENTS

WO    2003091899 A2    11/2003

OTHER PUBLICATIONS

Pedro Cano, et al., "Audio Fingerprinting: Concepts and Applications", (http://link.springer.com/chapter/10.1007/10966518_17), Computational Intelligence for Modelling and Prediction, 2005, vol. 2, pp. 233-245, Springer Berlin Heidelberg.

(Continued)

*Primary Examiner* — Hares Jami
(74) *Attorney, Agent, or Firm* — Chip Law Group

(57) ABSTRACT

Various aspects of a system and a method for accessing information associated with a sample of background audio in a computing device are disclosed herein. The computing device records, at predetermined time intervals, a sample of background audio in a vicinity of the computing device. The computing device transmits the recorded sample of background audio to a server computing device. The recorded sample of background audio and a metadata associated with the recorded sample of background audio is stored at the server computing device. The computing device accesses information associated with the recorded sample of background audio from the server computing device. The information is determined by the server computing device based on the recorded sample of background audio.

26 Claims, 8 Drawing Sheets

(56) References Cited

U.S. PATENT DOCUMENTS

2012/0317123 A1   12/2012  Green et al.
2013/0110848 A1    5/2013  Svendsen
2013/0232194 A1*  9/2013  Knapp .................... H04L 67/22
                                                    709/203
2016/0322066 A1*  11/2016  Sharifi .................... G10L 25/81

OTHER PUBLICATIONS

Dmitry Bogdanov, et al., "Semantic audio content-based music recommendation and visualization based on user preference examples" (http://www.sciencedirect.com/science/article/pii/S0306457312000763), Information Processing & Management, 2012, pp. 13-33, vol. 49, Issue 1.

* cited by examiner

SYSTEM AND METHOD FOR AUDIO IDENTIFICATION

FIELD

Various embodiments of the disclosure relate to audio identification. More specifically, various embodiments of the disclosure relate to method and system for managing a record of a user's audio environment for audio identification.

BACKGROUND

Almost everywhere people are exposed to various audio contents, such as music, through various sources, such as television, radio, audio systems, and the like. With the advent of new-generation consumer electronic (CE) devices (such as smartphones, handheld personal digital assistants (PDAs), and handheld recording devices), a user may record and/or identify audio content in the surroundings of the CE device and/or the user. Such recording/identification requires user intervention.

A user may also want to refer to an audio content associated with an audio environment of the user and/or the CE device at some point in time after the time when the audio content was played in the audio environment of the user and/or the CE device. In such a scenario, the user may no longer have access to identify the audio content.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method are provided for identifying audio content substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various implementations may be found in a system and/or a method for accessing information associated with a sample of background audio. Exemplary aspects of a method for accessing information associated with a sample of background audio may include a computing device communicably connected to a server computing device. The computing device may record, at predetermined time intervals, a sample of background audio in a vicinity of the computing device. The computing device may transmit the recorded sample of background audio to the server computing device. The recorded sample of background audio and a metadata associated with the recorded sample of background audio may be stored at the server computing device. The computing device may access information associated with the recorded sample of background audio from the server computing device. The information may be determined by the server computing device based on the recorded sample of background audio.

Various implementations may be found in a system and/or a method for recommending media content to a user associated with a computing device. Exemplary aspects of a method for recommending media content to the user may include a server computing device communicably coupled to a computing device. The server computing device may receive a sample of background audio from the computing device. The sample of background audio may be recorded in a vicinity of the computing device. The server computing device may store the sample of background audio and a metadata associated with the sample of background audio in the server computing device. The server computing device may recommend a media content to the user. The media content may be recommended based on the metadata associated with the sample of background audio.

Figure 1:
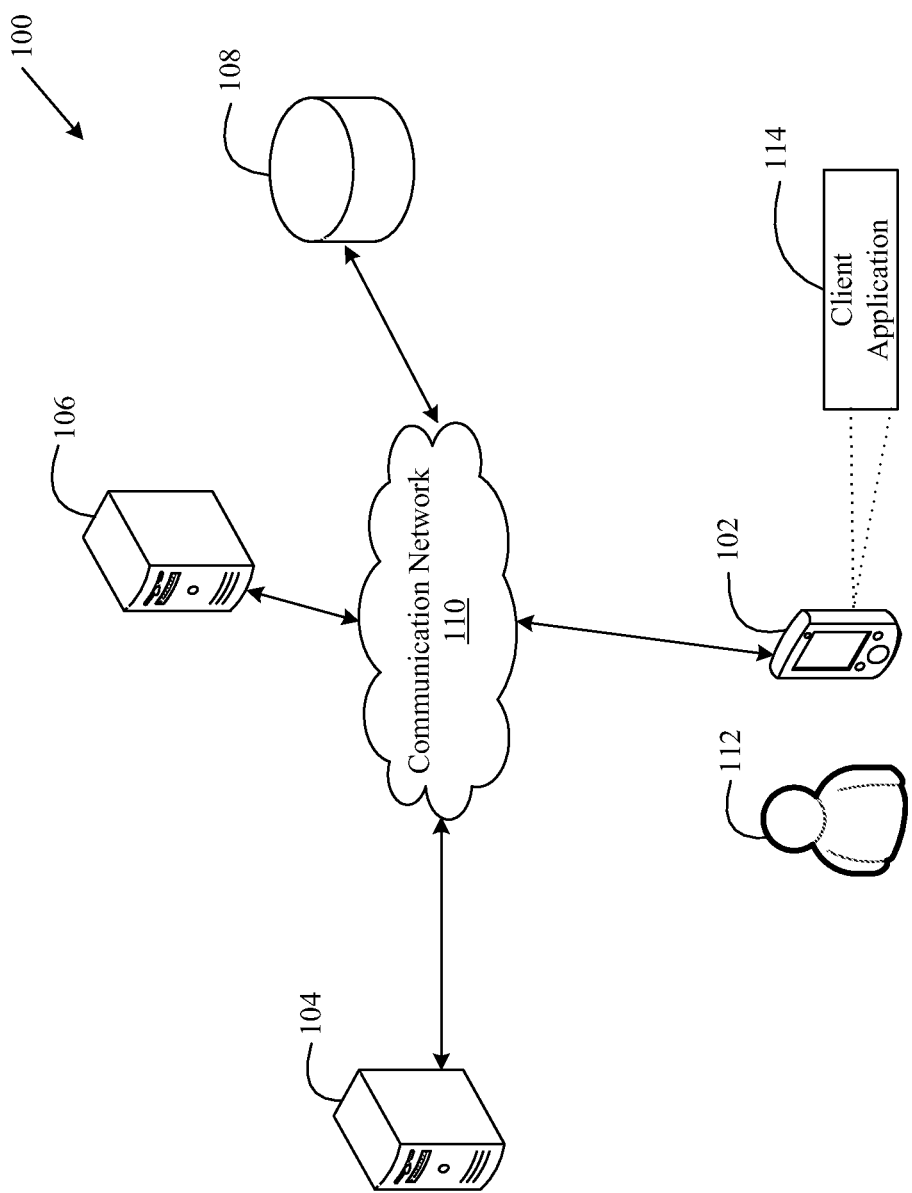
FIG. 1 is a block diagram illustrating a network environment for identifying audio content, in accordance with an embodiment of the disclosure.

FIG. 1 is a block diagram illustrating a network environment for identifying audio content, in accordance with an embodiment of the disclosure. With reference to FIG. 1, there is shown a network environment 100. The network environment 100 may comprise a computing device 102, a database server 104, a server computing device 106, a database 108, a communication network 110, and a user 112. The computing device 102 may comprise a client application 114. The computing device 102 may be communicatively coupled with the database server 104, and the server computing device 106, via the communication network 110. The computing device 102 may be associated with the user 112. Although FIG. 1 shows only one computing device (such as the computing device 102) and only one user (such as the user 112) for simplicity, one skilled in the art may appreciate that the implementation of disclosed embodiments can occur for a large number of computing devices and users.

The computing device 102 may be an electronic device capable of detecting and/or recording an audio. The computing device 102 may comprise suitable logic, circuitry, interfaces, and/or code that may be operable to detect and/or record audio. Examples of the computing device 102 may include, but are not limited to: a smartphone, a laptop, a tablet computer, a smartwatch, a microphone device, a recording device, a wireless headset device (for example, a Bluetooth headset), and/or a personal digital assistant (PDA) device.

In an embodiment, the computing device 102 may be operable to detect background audio in the vicinity of the computing device 102. The background audio may refer to audio received by the computing device 102 from an audio source in the vicinity of the computing device 102.

Examples of an audio source may include, but are not limited to, radio, television, public address system, and/or audio/video systems. In an embodiment, vicinity of the computing device 102 may refer to an area around the computing device 102, within a distance at which the computing device 102 may detect the background audio.

In an embodiment, background audio may include primary audio content, such as: music, advertisements, broadcast programs, movies, live concerts, and/or a combination of such media contents. In an embodiment, background audio may further include secondary audio content associated with surroundings of the computing device 102. In an embodiment, the secondary audio content may include one or more sounds (such as noise, conversations, and the like), other than the primary audio content, associated with the surroundings of the computing device 102.

The computing device 102 may be operable to record a sample of a detected background audio at predetermined time intervals. A sample of background audio may refer to a segment of background audio of any size. For example, the computing device 102 may record a ten second segment of background audio at predetermined time intervals of one minute.

In an embodiment, value of the predetermined time intervals may be stored in the computing device 102. In an embodiment, the user 112 may configure the computing device 102 to set and/or change the value of the predetermined time intervals.

In an embodiment, value of the length of a recorded sample may be stored in the computing device 102. In an embodiment, the user 112 may configure the computing device 102 to set and/or change the value of the length of a recorded sample.

Further, the computing device 102 may be operable to transmit a recorded sample of background audio (hereinafter, referred to as recorded audio sample) to the server computing device 106, via the communication network 110. In an embodiment, the computing device 102 may be operable to transmit metadata associated with a recorded audio sample to the server computing device 106.

The database server 104 may comprise a storage device, and/or multiple storage devices distributively connected, that maintain a repository of reference audio contents. Examples of reference audio contents may include, but are not limited to: advertisements, movies, music, broadcast programs, and/or the like. Each reference audio content may comprise a processed data file (for example, acoustic fingerprint) of the reference audio content, and/or information associated with the reference audio content. The processed data file of a reference audio content may be implemented by the use of various techniques that are well known to those skilled in the art. The database server 104 may be associated with an audio identification service provider. Examples of the audio identification service provider may include, but are not limited to: AudioID, Shazam, SoundHound, MusicBrainz, Gracenote, Musipedia, and/or The Echo Nest.

The server computing device 106 may comprise suitable logic, circuitry, interfaces, and/or code that may be operable to receive a recorded audio sample from the computing device 102. The server computing device 106 may receive metadata associated with a recorded audio sample from the computing device 102. The server computing device 106 may store a received recorded audio sample and metadata associated with the received recorded audio sample. Further, the server computing device 106 may determine information associated with a recorded audio sample received from the computing device 102. Information associated with a recorded audio sample may include, but is not limited to: genre, title, artist, album, and/or website associated with the sample. The server computing device 106 may transmit information associated with a received recorded audio sample to the computing device 102.

Implementation of the server computing device 106 may occur as a cluster or network of computing devices configured to jointly perform the functions of the server computing device 106. The server computing device 106 may optionally include storage media for storing samples of background audio, metadata associated with samples of background audio, and/or information associated with samples of background audio.

In an embodiment, the server computing device 106 may be combined with the database server 104. In such an embodiment, the server computing device 106 may be operable to manage operations of both the database server 104 and the server computing device 106. Further, in such an embodiment, the server computing device 106 may store content associated with both the database server 104 and the server computing device 106.

The database 108 may comprise suitable logic, circuitry, interfaces, and/or code that may be operable to store data. Examples of data stored in the database 108 may include, but are not limited to: samples of background audio, metadata associated with samples of background audio, information associated with background audio, and/or any other data. In an embodiment, the database 108 may communicate with the database server 104 and/or the server computing device 106, via the communication network 110. In an embodiment, the database 108 may be integrated with either or both of the database server 104, and the server computing device 106. The database 108 may be implemented by using several technologies that are well known to those skilled in the art. Some examples of technologies may include, but are not limited to, MySQL® and Microsoft SQL®.

The communication network 110 may include a medium through which the computing device 102, the database server 104, the server computing device 106, and the database 108 may communicate with each other. Examples of the communication network 110 may include, but are not limited to: the Internet, a Wireless Fidelity (Wi-Fi) network, a Wireless Local Area Network (WLAN), a Local Area Network (LAN), a telephone line (POTS), and/or a Metropolitan Area Network (MAN). Various devices in the network environment 100 may be operable to connect to the communication network 110, in accordance with various wired and wireless communication protocols, such as: Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

In operation, the computing device 102 may be operable to detect background audio in the vicinity of the computing device 102. The computing device 102 may record a sample of the detected background audio at predetermined time intervals. In an embodiment, the computing device 102 may locally store a recorded sample of background audio. In an embodiment, the computing device 102 may process a recorded audio sample to convert the recorded audio sample to a file format similar to the file format of a reference audio content stored in the database server 104.

In an embodiment, the computing device 102 may determine first metadata associated with a recorded audio sample. The first metadata may include date, time, day of week, and/or volume associated with a recorded audio sample. In an embodiment, the first metadata may further include information associated with the location and/or the surroundings of the computing device 102, when a sample of background audio is recorded.

The computing device 102 may transmit a processed recorded audio sample and first metadata associated with a recorded audio sample to the server computing device 106, via the communication network 110. In an embodiment, the computing device 102 may transmit a processed recorded audio sample and associated first metadata to the server computing device 106 each time a sample of background audio is recorded. In an embodiment, the computing device 102 may transmit processed recorded audio samples and associated first metadata to the server computing device 106, at predetermined time intervals.

In an embodiment, the server computing device 106 may receive a processed recorded audio sample and first metadata associated with the processed recorded audio sample. The server computing device 106 may generate a second metadata associated with a processed recorded audio sample received from the computing device 102. The second metadata may include date and/or time when a processed recorded audio sample is received by the server computing device 106. In an embodiment, the server computing device 106 may store a processed recorded audio sample, first metadata and second metadata associated with the processed recorded audio sample, and information associated with the recorded audio sample in the database 108.

The server computing device 106 may compare a processed recorded audio sample with reference audio contents stored in the database server 104. Based on the comparison, the server computing device 106 may identify a reference audio content that corresponds to a recorded audio sample. The server computing device 106 may determine information associated with the identified reference audio content as the information associated with the recorded audio sample.

In an embodiment, the server computing device 106 may create an entry that corresponds to each sample of the background audio recorded by the computing device 102, at predetermined time intervals. The entry may include the recorded audio sample, the associated first metadata and second metadata, and the information associated with the recorded audio sample. In an embodiment, the server computing device 106 may map the entries to a profile associated with the user 112 and/or the computing device 102.

In an embodiment, the computing device 102 may not process a recorded audio sample. For example, the computing device 102 may not have processing capabilities required to process the recorded audio sample. In such an embodiment, the computing device 102 may transmit an unprocessed recorded audio sample and the associated first metadata to the server computing device 106. The server computing device 106 may process the recorded audio sample received from the computing device 102.

In an embodiment, the server computing device 106 may determine information associated with a recorded audio sample received from the computing device 102. The server computing device 106 may transmit the determined information associated with a recorded audio sample to the computing device 102. In an embodiment, the user 112 may provide input via a user interface on the computing device 102, to access information associated with a recorded audio sample from the server computing device 106.

In an embodiment, the server computing device 106 may be operable to recommend media content to the user 112, based on first metadata associated with recorded audio samples stored in the server computing device 106. Various examples of media content may include, but are not limited to: music, advertisements, broadcast programs, movies, live concerts, and/or a combination of such media contents. In an embodiment, the server computing device 106 may recommend media content via a user interface of the computing device 102.

Figure 2:
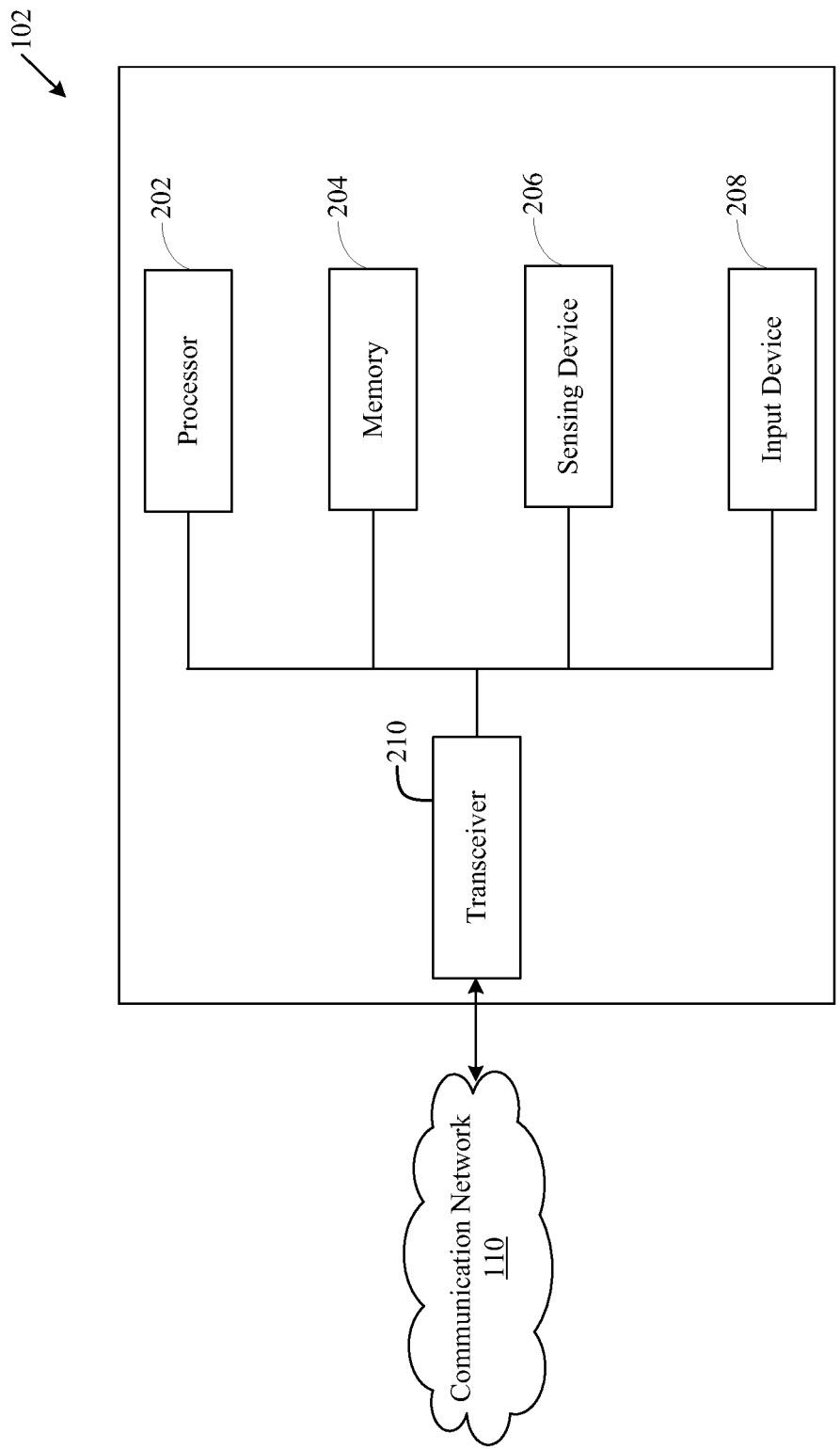
FIG. 2 is a block diagram illustrating an exemplary computing device, in accordance with an embodiment of the disclosure.

FIG. 2 is a block diagram illustrating a computing device, in accordance with an embodiment of the disclosure. FIG. 2 is explained in conjunction with elements from FIG. 1. With reference to FIG. 2, there is shown the computing device 102. The computing device 102 may comprise one or more processors, such as a processor 202, a memory 204, one or more sensing devices, such as a sensing device 206, one or more Input-Output (I/O) devices, such as an I/O device 208, and a transceiver 210. The processor 202 may be communicatively coupled to the memory 204, and the sensing device 206. Further, the processor 202 may be further communicatively coupled to the I/O device 208 and the transceiver 210.

The processor 202 may comprise suitable logic, circuitry, interfaces, and/or code that may be operable to execute a set of instructions stored in the memory 204. The processor 202 may be implemented based on a number of processor technologies known in the art. Examples of the processor 202 may be: an X86-based processor, a Reduced Instruction Set Computing (RISC) processor, an Application-Specific Integrated Circuit (ASIC) processor, a Complex Instruction Set Computing (CISC) processor, and/or any other processor.

The memory 204 may comprise suitable logic, circuitry, and/or interfaces that may be operable to store a machine code and/or a computer program having at least one code section executable by the processor 202. The memory 204 may store at least one code section associated with the sensing device 206. The memory 204 may further store recorded audio samples, and their associated first metadata. The memory 204 may further store at least one code section associated with one or more applications installed on the computing device 102. Examples of such one or more applications may include, but are not limited to: the client application 114, a social networking application, a web browser application, games-based applications, and/or music-based applications. Examples of such one or more applications may further include, but not be limited to, one or more communication applications, such as an email application and/or a text chat application. Examples of implementation of the memory 204 may include, but are not limited to: Random Access Memory (RAM), Read Only Memory (ROM), Hard Disk Drive (HDD), and/or a Secure Digital (SD) card.

The sensing device 206 may correspond to various sensors that may be associated with the computing device 102. Examples of such sensors may include, but are not limited to, audio sensors, motion sensors, and/or location sensors.

In an embodiment, the sensing device 206 may correspond to an audio sensor. In such an embodiment, the sensing device 206 may comprise suitable logic, circuitry, interfaces, and/or code that may be operable to detect audio in vicinity of the computing device 102. For example, the sensing device 206 may be a microphone device that may detect audio in the vicinity of the computing device 102. In an embodiment, the sensing device 206 may detect background audio in the vicinity of the computing device 102.

In an embodiment, the sensing device 206 may correspond to a location sensor. Examples of a location sensor may include, but are not limited to: a Global Positioning System (GPS), a WiFi-based positioning system, a cellular telephony-based positioning system, Bluetooth™-based positioning system, and/or a triangulation system. In such an embodiment, the sensing device 206 may be operable to determine the location of the computing device 102, when a sample of background audio is recorded.

The I/O device 208 may comprise various input and output devices that may be operable to connect to the processor 202. Examples of the input devices may include, but are not limited to: a keyboard, a mouse, a joystick, a touch screen, a microphone, a camera, a motion sensor, a light sensor, and/or a docking station. Examples of the output devices may include, but are not limited to, a display screen, and/or a speaker.

The transceiver 210 may comprise suitable logic, circuitry, interfaces, and/or code that may be operable to communicate with the database server 104, and/or the server computing device 106, via various communication interfaces. The transceiver 210 may implement known technologies for supporting wired or wireless communication with the communication network 110. The transceiver 210 may include, but is not limited to: an antenna, a radio frequency (RF) transceiver, one or more amplifiers, a tuner, one or more oscillators, a digital signal processor, a coder-decoder (CODEC) chipset, a subscriber identity module (SIM) card, and/or a memory. The transceiver 210 may communicate via wireless communication with networks, such as: the Internet, an Intranet and/or a wireless network, such as a cellular telephone network, a wireless local area network (LAN) and/or a metropolitan area network (MAN). The wireless communication may use any communication standards, protocols and technologies including, but not limited to: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The user 112 may install the client application 114 on the computing device 102. The client application 114 may enable the computing device 102 to communicate with the database server 104 and/or the server computing device 106. Further, the client application 114 may enable the computing device 102 to record a sample of background audio in the vicinity of the computing device 102, at predetermined time intervals. In an embodiment, the client application 114 may process a recorded audio sample.

In operation, the processor 202 may initiate the client application 114, stored in the memory 204, in response to an input received from the user 112. When the client application 114 is initiated, the sensing device 206 may detect background audio in the vicinity of the computing device 102. The processor 202 may be operable to record a sample of the detected background audio at predetermined time intervals. In an embodiment, the processor 202 may locally store a recorded audio sample in the memory 204.

In an embodiment, the processor 202 may process a recorded audio sample. Processing of a recorded audio sample may include, but is not limited to, changing file format, encoding, and/or filtering noise. In an embodiment, the processor 202 may process a recorded audio sample to generate a data file that represents a time-varying frequency spectrum (such as an acoustic fingerprint) of the recorded audio sample. In an embodiment, the processor 202 may process a recorded audio sample to convert file format of the recorded audio sample to a file format similar to that of reference audio contents stored in the database server 104. Various algorithms that are well known to those skilled in the art may be implemented to process a recorded audio sample of background audio. In an embodiment, the processor 202 may locally store a processed recorded audio sample in the memory 204.

In an embodiment, the processor 202 may determine primary audio content and secondary audio content in a recorded audio sample. In such an embodiment, the processor 202 may filter the recorded audio sample to separate the primary audio content and the secondary audio content. In an embodiment, the processor 202 may separately process primary audio content and secondary audio content.

The processor 202 may generate first metadata associated with a recorded audio sample. In an embodiment, first metadata may include date, time, day of week, and/or volume associated with a recorded audio sample. In an embodiment, first metadata may further include information associated with the location and/or surroundings of the computing device 102, when a sample of background audio is recorded. In an embodiment, first metadata may include secondary audio content.

In an embodiment, the sensing device 206 may determine the location of the computing device 102 when a sample of background audio is recorded. In an embodiment, when the computing device 102 records a sample of background audio, the sensing device 206 may identify a place near the computing device 102, such as: the office of the user 112, a restaurant, a gymnasium, a retail store visited by the user 112, the home of the user 112, and/or the like. When a sample of background audio is recorded, the processor 202 may determine the identified nearby place as the location of the computing device 102. In an embodiment, the user 112 may select a location via a user interface of the client application 114. In such an embodiment, the processor 202 may determine the location selected by the user 112 as the location of the computing device 102. In an embodiment, when a sample of background audio is recorded, the sensing device 206 may determine the geographic coordinates of the location of the computing device 102 as the location of the computing device 102.

In an embodiment, when a sample of background audio is recorded, the processor 202 may determine information associated with the surroundings of the computing device 102. In an embodiment, when a sample of background audio is recorded, the processor 202 may analyze secondary audio content to determine information associated with the surroundings of the computing device 102. In an embodiment, the processor 202 may determine one or more sounds in the secondary audio content, to identify the surroundings of the computing device 102. For example, the processor 202 may determine the sound of traffic in secondary audio content and determine the surroundings as the outdoors. In another example, the processor 202 may determine the sound of nearby machines to determine the surroundings as a workshop.

In an embodiment, the user 112 may select a surrounding from one or more predefined surroundings (such as: the outdoors, the inside of a car, a workshop, and/or a gymnasium) via a user interface of the client application 114. In such an embodiment, the processor 202 may determine the surroundings selected by the user 112, as the surrounding associated with the computing device 102.

The processor 202 may transmit a processed recorded audio sample and first metadata associated with the processed recorded audio sample to the server computing device 106. In an embodiment, the processor 202 may receive information associated with a recorded audio sample from the server computing device 106. In an embodiment, each time a recorded audio sample is transmitted to the server computing device 106, the processor 202 may receive information associated with the recorded audio sample.

In an embodiment, the user 112 may wish to determine information associated with a recorded audio sample at a time later than the time at which the sample of background audio is recorded by the computing device 102. The processor 202 may provide a user interface of the client application 114, through which the user 112 may submit a request for information associated with a recorded audio sample. The processor 202 may transmit a request for information associated with a recorded audio sample to the server computing device 106. In response to the transmitted request, the processor 202 may receive information associated with a recorded audio sample from the server computing device 106. The processor 202 may display information associated with a recorded audio sample on the user interface of the client application 114.

In an embodiment, a request for information associated with a recorded audio sample may include one or more of date, time, day of week, and/or location of when a sample of background audio is recorded by the computing device 102. In such an embodiment, the processor 202 may receive information associated with audio samples that were recorded at the date, time, day of week, and/or location specified by the request.

In an embodiment, a request for information associated with a recorded audio sample may include a time range. In such an embodiment, the processor 202 may receive information associated with audio samples that were recorded in that time-range. In an embodiment, a request for information associated with a recorded audio sample may include a location. In such an embodiment, the processor 202 may receive information associated with audio samples that were recorded at that location.

In an embodiment, the processor 202 may recommend one or more songs to the user 112, via the user interface of the client application 114. In an embodiment, the processor 202 may recommend songs to the user 112, based on the current location and/or surroundings of the computing device 102. In such an embodiment, the processor 202 may determine the current location and/or surroundings of the computing device 102. The processor 202 may determine that the computing device 102 was present at the current location and/or surroundings in past. In such a case, the processor 202 may determine one or more songs to which the computing device 102 has been exposed in the past or at the current location and/or surroundings. The processor 202 may determine the one or more songs based on recorded audio samples that correspond to the current location and/or the surroundings stored in the profile associated with the user 112, in the server computing device 106.

In an embodiment, the processor 202 may recommend one or more songs to the user 112, based on secondary audio content. In such an embodiment, the processor 202 may determine a secondary audio content of a currently recorded sample. The processor 202 may determine a previously recorded sample stored in the server computing device 106, which has secondary audio content similar to the secondary audio content of the currently recorded sample. The processor 202 may recommend one or more songs that correspond to the determined previously recorded sample.

In an embodiment, the processor 202 may recommend advertisements based on the current location and/or surroundings of the computing device 102. In such an embodiment, the processor 202 may determine one or more advertisements that correspond to a sample of background recorded by the computing device 102, at the current location and/or surroundings of the computing device 102.

In an embodiment, the processor 202 may process a recorded audio sample based on the power level of the computing device 102. In an embodiment, the processor 202 may process a recorded audio sample when a charge level of a battery of the computing device 102 is greater than a predetermined threshold value. In such an embodiment, the processor 202 may store samples of background audio recorded at predetermined time intervals in the memory 204. Samples of background audio are stored until the charge level of the battery of the computing device 102 falls to less than the predetermined threshold value. When the charge level of the battery of the computing device 102 exceeds the predetermined threshold value, the processor 202 may process the recorded audio samples stored in the memory 204.

In an embodiment, the computing device 102 may not be connected to the communication network 110 at a time when the computing device 102 records a sample of background audio. In such an embodiment, the processor 202 may store samples of background audio recorded at predetermined time intervals and their associated first metadata in the memory 204. The processor 202 may transmit the recorded audio samples and their associated first metadata to the server computing device 106, when the computing device 102 is re-connected to the communication network 110.

In an embodiment, the computing device 102 may be connected to the communication network 110 at a time when the computing device 102 records a sample of background audio. In such an embodiment, the processor 202 may transmit a sample of background audio and associated first metadata to the server computing device 106 instantly when the sample of background audio is recorded. In an embodiment, the processor 202 may transmit a recorded audio sample and associated first metadata to the server computing device 106, when the computing device 102 is connected to the communication network 110, via a predetermined connection, such as a Wi-Fi connection. In an embodiment, the user 112 may select the predetermined connection via a user interface of the client application 114.

In an embodiment, the processor 202 may transmit a recorded audio sample to the server computing device 106, without processing. In such an embodiment, the server computing device 106 may process recorded audio samples received from the computing device 102.

In an embodiment, the processor 202 may discard the recorded audio sample when the primary audio content is not determined in the recorded audio sample. For example, the processor 202 may determine that the recorded audio content does not include a meaningful audio content, such as a song, advertisement, and/or the like. In such a case, the processor 202 may discard the recorded audio sample.

In an embodiment, the processor 202 may record a sample of the background audio when the magnitude of the background audio, measured by the sensing device 206, is above a predetermined threshold level. The user 112 may configure the computing device 102 to set and/or modify the value of the predetermined threshold level.

Figure 3:
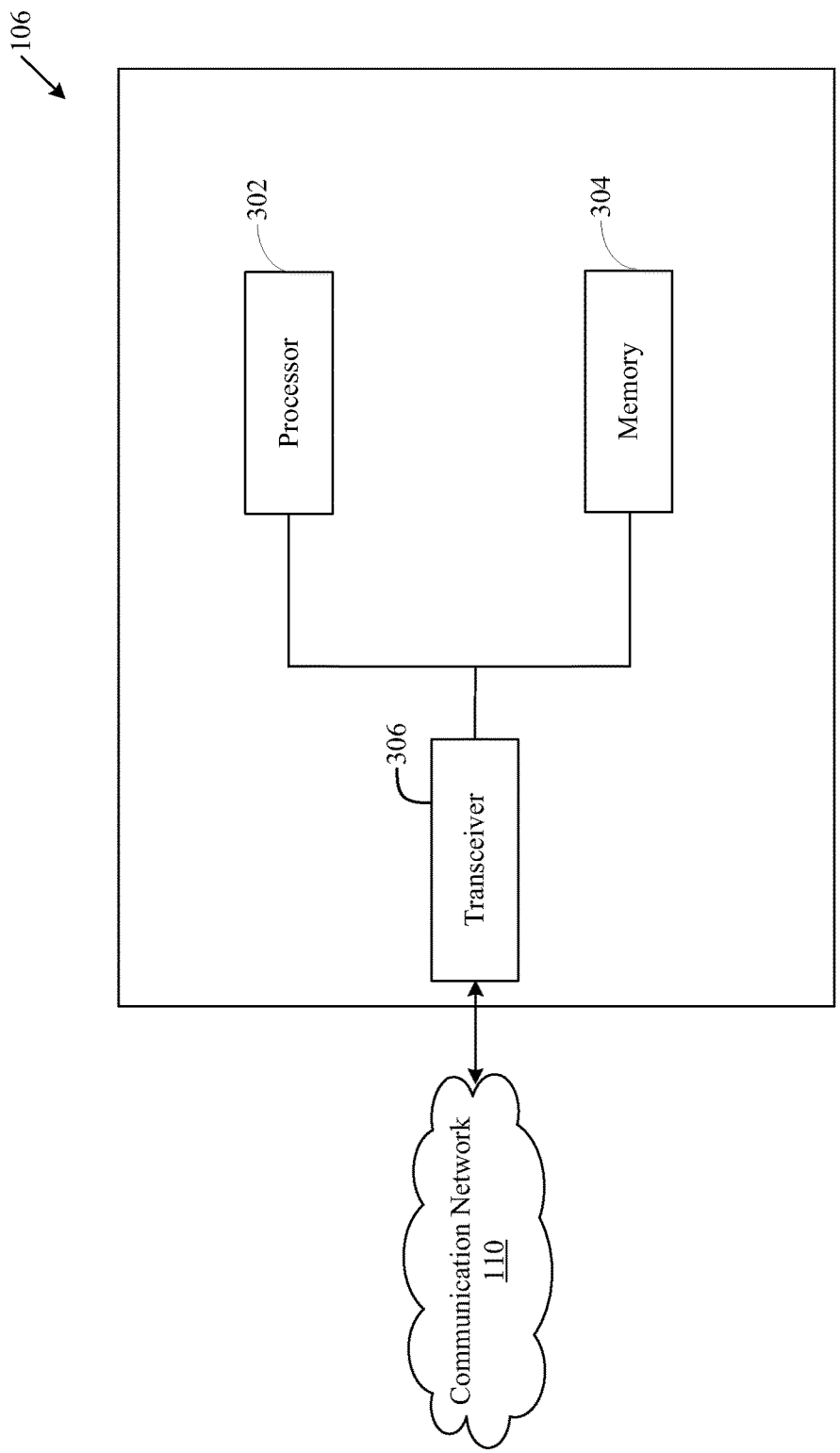
FIG. 3 is a block diagram illustrating an exemplary server computing device, in accordance with an embodiment of the disclosure.

FIG. 3 is a block diagram illustrating a server computing device, in accordance with an embodiment of the disclosure. FIG. 3 is explained in conjunction with elements from FIG. 1 and FIG. 2. With reference to FIG. 3, there is shown the server computing device 106. The server computing device 106 may comprise one or more processors, such as a processor 302, a memory 304, and a transceiver 306. The processor 302 may be communicatively coupled to the memory 304 and the transceiver 306.

The processor 302 may comprise suitable logic, circuitry, interfaces, and/or code that may be operable to execute a set of instructions stored in the memory 304. The processor 302 may be implemented based on a number of processor technologies known in the art. Examples of the processor 302 may include: an X86-based processor, a Reduced Instruction Set Computing (RISC) processor, an Application-Specific Integrated Circuit (ASIC) processor, a Complex Instruction Set Computing (CISC) processor, and/or any other processor.

The memory 304 may comprise suitable logic, circuitry, and/or interfaces that may be operable to store a machine code and/or a computer program having at least one code section executable by the processor 302. The memory 304 may further store recorded audio samples, first metadata and second metadata associated with the recorded audio samples, and information associated with the recorded audio samples. Examples of implementation of the memory 304 may include, but are not limited to: Random Access Memory (RAM), Read Only Memory (ROM), Hard Disk Drive (HDD), and/or a Secure Digital (SD) card.

The memory 304 may comprise a reference audio content data store. The reference audio content data store may be operable to store the reference audio contents. Such a reference audio content data store may be communicatively coupled with a secondary storage device, for example, a hard disk or external storage device, such as a compact disc (CD). The reference audio content data store may be implemented by the use of various media content database management systems that are well known to those skilled in the art.

The transceiver 306 may comprise suitable logic, circuitry, interfaces, and/or code that may be operable to communicate with the computing device 102, the database server 104, and/or the database 108, via various communication interfaces. The transceiver 306 may implement known technologies for supporting wired or wireless communication with the communication network 110. The transceiver 306 may include, but not limited to: an antenna, a radio frequency (RF) transceiver, one or more amplifiers, a tuner, one or more oscillators, a digital signal processor, a coder-decoder (CODEC) chipset, a subscriber identity module (SIM) card, and/or a memory. The transceiver 306 may communicate via wireless communication with networks, such as the Internet, an Intranet, and/or a wireless network. Examples of such wireless networks may include, but are not limited to: a cellular telephone network, a wireless local area network (LAN), and/or a metropolitan area network (MAN). The wireless communication may use any communication standards, protocols and/or technologies including, but not limited to: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g, and/or IEEE 802.11n), voice over Internet Protocol (VoIP), Wi-MAX, a protocol for email, instant messaging, and/or Short Message Service (SMS).

In operation, the server computing device 106 may receive a recorded audio sample and first metadata associated with the recorded audio sample from the computing device 102, via the transceiver 306. In an embodiment, the processor 302 may process a received recorded audio sample. In an embodiment, the processor 302 may process a received recorded audio sample to generate a data file that represents a time-varying frequency spectrum (such as an acoustic fingerprint) of the received recorded audio sample. In an embodiment, the processor 302 may process the received recorded audio sample to convert the file format of the received recorded audio sample to a file format similar to that of reference audio contents stored in the database server 104. Various algorithms that are well known to those skilled in the art may be implemented to process the received recorded audio sample of background audio. Based on the processing, the processor 302 may generate a processed recorded audio sample. In an embodiment, the processor 302 may receive a processed recorded audio sample from the computing device 102.

In an embodiment, the processor 302 may generate a second metadata associated with a recorded audio sample received from the computing device 102. The second metadata may include date and/or time when a recorded audio sample is received by the server computing device 106.

The processor 302 may compare the processed recorded audio sample with reference audio contents. In an embodiment, the processor 302 may compare the processed recorded audio sample with reference audio contents stored in the database server 104. In an embodiment, the processor 302 may compare the processed recorded audio sample with reference audio contents stored in the memory 304. Based on the comparison, the processor 302 may identify a reference audio content that corresponds to a processed recorded audio sample. The processor 302 may determine information associated with the identified reference audio content.

In an embodiment, the processor 302 may identify a song as a reference audio content that corresponds to a processed recorded audio sample. In such an embodiment, the processor 302 may determine information associated with the song. The information associated with the song may include one or more of: genre, title, artist, and/or album of the song. In an embodiment, the information associated with the song may include one or more websites to download the song. In an embodiment, the information associated with the song may include a radio station and/or a television channel broadcasting the song. In an embodiment, the information associated with the song may include time-related data of a portion of the song, the computing device 102 was exposed to when sample of the song was recorded by the computing device 102.

In an embodiment, the processor 302 may identify an advertisement as a reference audio content that corresponds to a processed recorded audio sample. In such an embodiment, the processor 302 may determine information associated with the advertisement. The information associated with the advertisement may include one or more of a product and/or service being advertised and/or nearby stores to purchase the advertised product and/or service. In an embodiment, the information associated with the advertisement may include one or more websites to purchase the advertised product and/or service. In an embodiment, the information associated with the advertisement may include a radio station and/or a television channel broadcasting the advertisement.

The processor 302 may store a processed recorded audio sample, first metadata and second metadata associated with the processed recorded audio sample, and information associated with the processed recorded audio sample in the memory 304.

In an embodiment, the processor 302 may create an entry that corresponds to each sample of the background audio recorded at the predetermined time intervals. The entry may include one or more of: a recorded audio sample, first metadata and second metadata associated with the recorded audio sample, and information associated with the reference audio content that corresponds to the recorded audio sample. The processor 302 may store the entry in the memory 304.

In an embodiment, the processor 302 may store the entries in the order of the time when the sample of the background audio that corresponds to the entries is recorded. Thus, the processor 302 may maintain a chronological record of samples of background audio in the vicinity of the computing device 102. The processor 302 may maintain the chronological record in the memory 304.

In an embodiment, the processor 302 may map the entries to a profile associated with the user 112 and/or the computing device 102. In such an embodiment, the user 112 and/or the computing device 102 may be registered with the server computing device 106 to create the associated profile. In an embodiment, more than one computing device may be registered with a profile of the user 112.

In an embodiment, the processor 302 may recommend songs to the user 112, based on a location and/or surroundings associated with the computing device 102. In such an embodiment, the processor 302 may determine one or more songs from the entries stored in the memory 304. The determined one or more songs may correspond to the location and/or surroundings associated with the computing device 102. The processor 302 may generate a playlist that corresponds to the location and/or surroundings comprising the determined one or more songs. When the user 112 visits the location and/or the surroundings, the processor 302 may recommend songs to the user 112 from the playlist that corresponds to the location and/or the surroundings. The processor 302 may recommend the songs to the user 112 via a user interface of the client application 114. For example, when the user 112 visits the gymnasium, the processor 202 may determine the surroundings of the computing device 102 as the gymnasium. The processor 302 may recommend playlist of songs that correspond to the gymnasium.

In an embodiment, the processor 302 may generate a playlist of songs for each of a plurality of locations and/or surroundings that are frequently visited by the user 112. In an embodiment, the processor 302 may generate a playlist of songs for each of a plurality of locations and/or surroundings that are marked as favorite by the user 112.

In an embodiment, the processor 302 may recommend songs to the user 112, based on a time period of a day. In such an embodiment, the processor 302 may determine one or more songs from the entries stored in the memory 304. The determined one or more songs may correspond to the time period of the day when the entries were stored in the memory 304. The processor 302 may generate a playlist comprising the determined one or more songs. The generated playlist corresponds to the time period of the day. The processor 302 may recommend one or more songs from the generated playlist to the user 112 during the time period of the day. The processor 302 may recommend the songs to the user 112 via the user interface of the client application 114. For example, on weekdays, between 9:00 am to 9:30 am, the user 112 may travel to the office. The playlist that corresponds to the time period of 9:00 am to 9:30 on the weekdays may include one or more songs the user 112 is exposed to when the user 112 travels to the office. In an embodiment, the processor 302 may recommend songs based on a combination of a time period of a day, a location and/or the surroundings of the computing device 102.

In an embodiment, the processor 302 may generate a playlist of songs played in a concert attended by the user 112. In such an embodiment, the processor 302 may receive an input signal from the computing device 102, to generate the playlist that corresponds to the concert. The input signal may be provided by the user 112, via a user interface of the client application 114. The processor 302 may receive samples of the background audio recorded at the predetermined time intervals from the computing device 102. The processor 302 may determine information associated with the recorded audio samples. The processor 302 may generate a playlist that corresponds to the concert, based on information associated with the recorded audio samples. The playlist may include songs that correspond to the recorded audio samples.

In an embodiment, the processor 302 may identify one or more songs to which the computing device 102 is frequently exposed over a predetermined period of time. The processor 302 may generate a playlist including the identified one or more songs. The processor 302 may recommend songs from the generated playlist to the user 112. The processor 302 may recommend the songs to the user 112, via a user interface of the client application 114.

Although various embodiments in the disclosure have been described with reference to recommending a song to the user 112, the disclosure is not so limited. The disclosed system and method may recommend various audio and/or video media contents, such as: music, advertisements, broadcast programs, movies, live concerts, and/or a combination of such media contents.

Although various embodiments in the disclosure have been described with reference to song as the background audio, the disclosure is not so limited. The background audio may also correspond to various media contents, such as music, advertisements, broadcast programs, movies, live concerts, and/or a combination of such media contents.

Figure 4A:
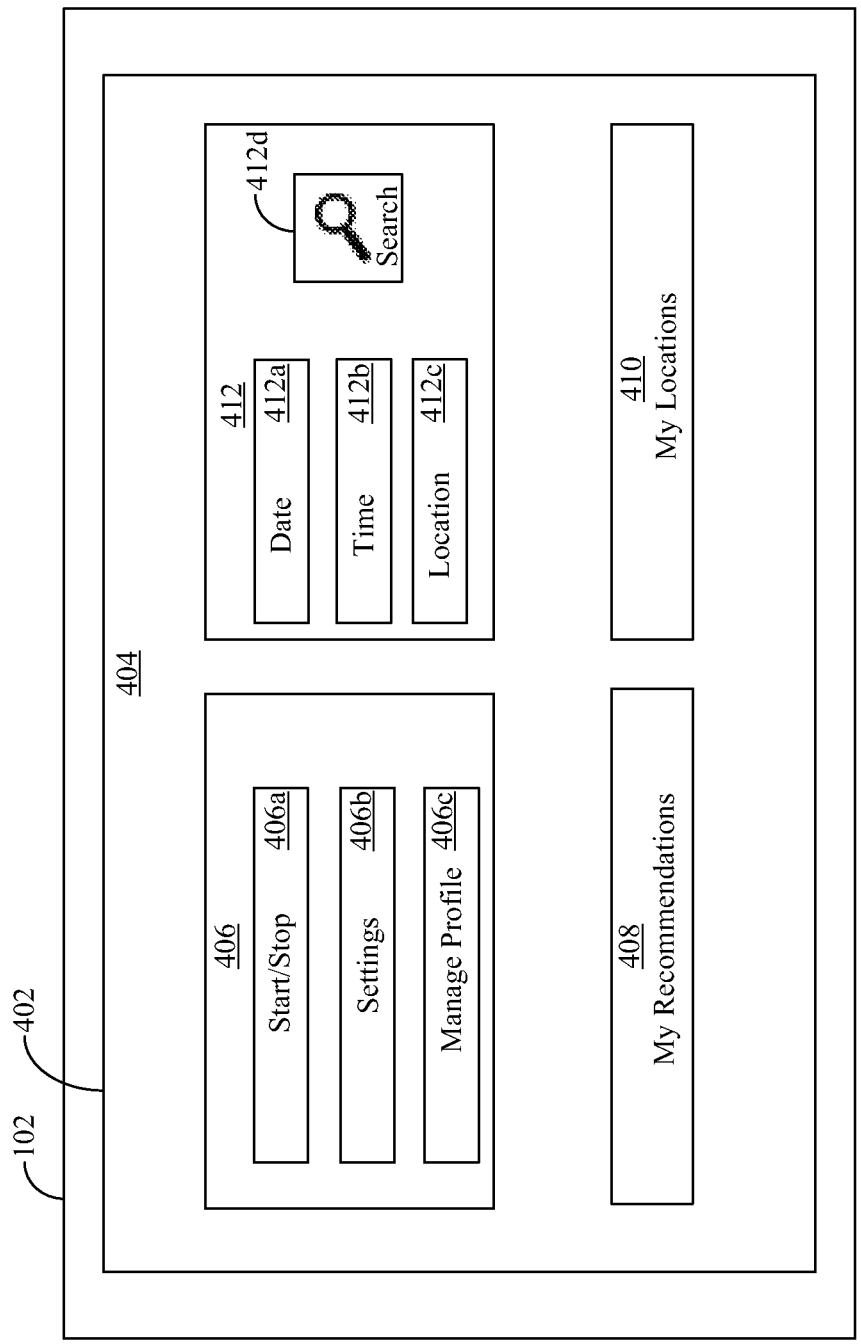
FIGS. 4A, 4B, and 4C illustrate exemplary user interfaces rendered by a computing device, in accordance with an embodiment of the disclosure.
Figure 4B:
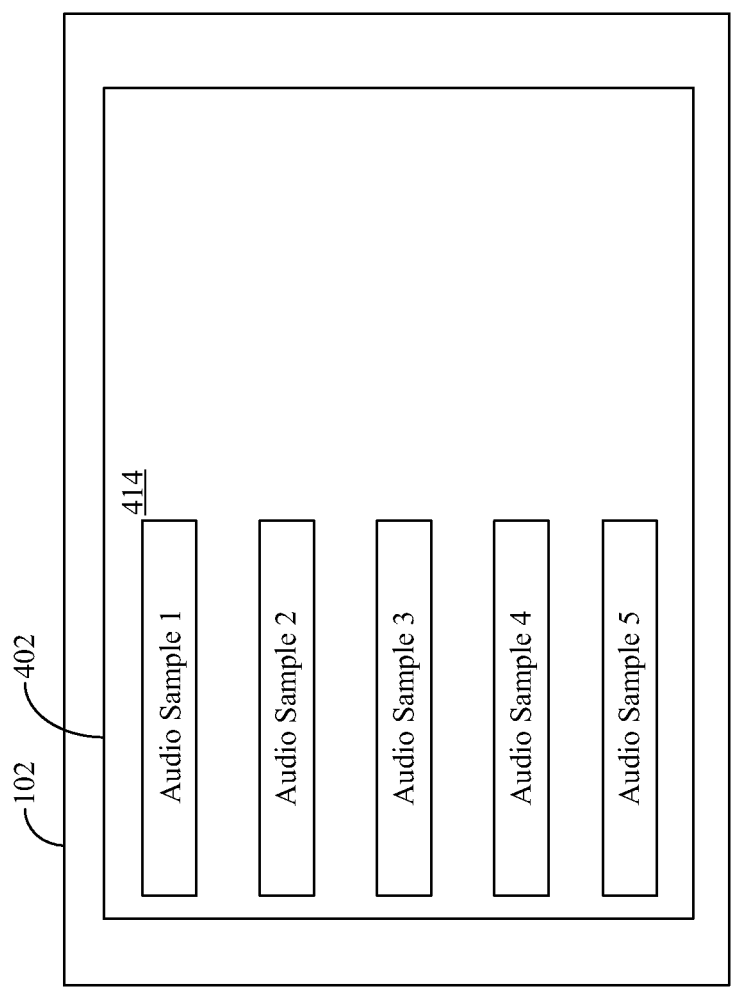
Figure 4C:
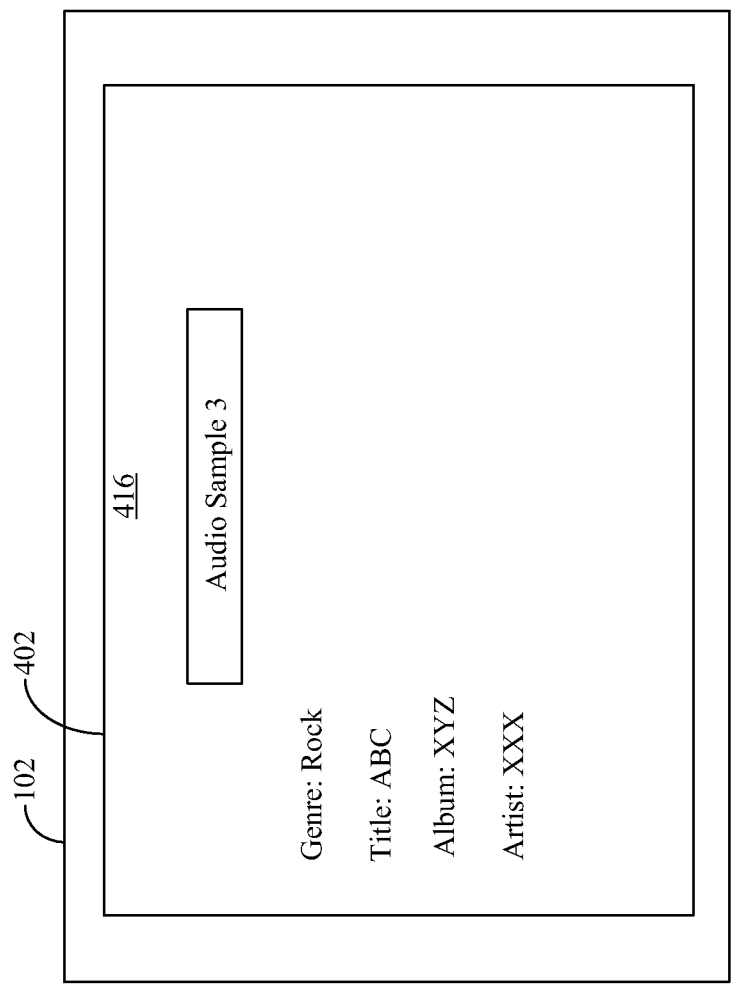

FIGS. 4A, 4B, and 4C illustrate exemplary instances of a computing device, in accordance with an embodiment of the disclosure. FIGS. 4A, 4B, and 4C are explained in conjunction with elements from FIG. 1, FIG. 2, and FIG. 3. With reference to FIGS. 4A, 4B, and 4C, there is shown a display screen 402 of the computing device 102. The display screen 402 may render a user interface.

With reference to FIG. 4A, the display screen 402 may render a user interface 404. The user interface 404 may correspond to the client application 114, executed at the computing device 102. The user interface 404 may comprise a first display segment 406, a "My Recommendations" option 408, a "My Location" option 410, and a second display segment 412.

The first display segment 406 may illustrate a plurality of options, such as a "Start/stop" option 406a, a "Settings" option 406b, and "Manage Profile" option 406c. The plurality of options may be selectable by the user 112, associated with the computing device 102. The "Start/stop" option 406a, when selected, may start or stop the execution of the client application 114. In an embodiment, when the "Start/stop" option 406a is selected, the processor 202 may be enabled to record samples of background audio at predetermined time intervals. In an embodiment, when the "Start/stop" option 406a, is selected again, the processor 202 may be disabled from recording samples of background audio.

The "Settings" option 406b, when selected, may facilitate the user 112 to configure various parameters associated with the client application 114. In an embodiment, the "Settings" option 406b may facilitate the user 112 to set and/or change the value of one or more of: predetermined time intervals at which samples of background audio are to be recorded, length of a recorded audio sample, and/or predetermined threshold value of power level of the computing device 102.

The "Manage Profile" option 406c, when selected, may facilitate the user 112 to manage a profile associated with the user 112. In an embodiment, the "Manage Profile" option 406c may facilitate the user 112 to add one or more computing devices to an existing profile of the user 112. In an embodiment, the "Manage Profile" option 406c may facilitate the user 112 to delete one or more computing devices from an existing profile of the user 112. In an embodiment, the "Manage Profile" option 406c may facilitate the user 112 to delete entries that correspond to recorded samples stored in the server computing device 106. In an embodiment, the "Manage Profile" option 406c may facilitate the user 112 to add or delete a profile associated with the user 112.

The "My Recommendations" option 408, when selected by the user 112, may display a list of one or more songs recommended to the user 112, based on recorded audio samples stored in the server computing device 106. In an embodiment, the "My Recommendations" option 408, when selected by the user 112, may display one or more playlist of songs generated by the server computing device 106. The playlist of the songs may correspond to one or more of: locations and/or surroundings, one or more time periods of a day, and/or frequently exposed songs.

The "My Location" option 410, when selected by the user 112, may display a list of nearby locations, such as: a restaurant, office of the user 112, amusement park, retail store, and/or residence of the user 112. In an embodiment, the user 112 may select a location from the list of locations as a current location of the computing device 102.

The second display segment 412 may facilitate the user 112 to search for a previously recorded audio sample. The second display segment 412 may illustrate a plurality of input fields, such as a "Date" input field 412a, a "Time" input field 412b, and a "Location" input field 412c. The plurality of input fields may receive input from the user 112. The user 112 may provide input in at least one of the plurality of input fields. In the "Date" input field 412a, the user 112 may input a date when a sample of background audio is recorded. In the "Time" input field 412b, the user 112 may input time when a sample of the background audio is recorded. In an embodiment, the user 112 may input a time range in the "Time" input field 412b. In the "Location" input field 412c, the user 112 may input location of the computing device 102, when a sample of the background audio is recorded. In an embodiment, a drop-down menu that includes a list of locations may appear when the user 112 selects the "Location" input field 412c. The user 112 may select a location from the drop-down list.

The second display segment 412 may further include an icon "Search" 412d. The user 112 may select the icon "Search" 412d, after providing input to one or more input fields. The icon "Search" 412d, when selected by the user 112, may display a list of one or more recorded audio samples on the display screen 402.

FIG. 4B illustrates a user interface 414 to display a list of one or more recorded audio samples. The one or more recorded audio samples in the displayed list may correspond to input provided by the user 112, in one or more input fields. The user 112 may select a recorded audio sample from the displayed list. For example, the user 112 may select an "audio sample 3" from the list of one or more recorded audio samples. In response to selection of a recorded audio sample from the displayed list, the processor 202 may display information associated with the selected recorded audio sample the display screen 402.

FIG. 4C illustrates a user interface 416 to display information associated with the selected recorded audio sample. For example, the selected recorded "audio sample 3" may refer to a song. In such a case, the information associated with the song may include genre, title, album, and/or artist of the song. Notwithstanding, the disclosure may not be so limited and the display screen 402 may display other options and/or input fields, without limiting the scope of the disclosure.

Figure 5:
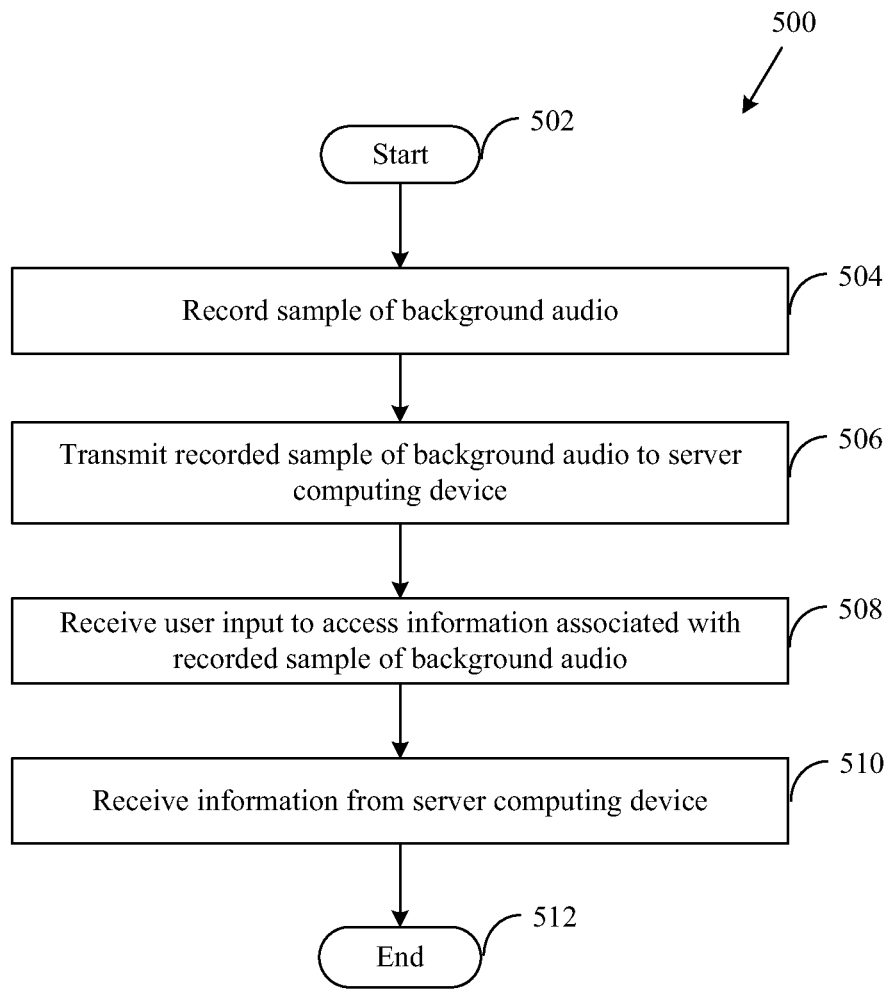
FIG. 5 is a flow chart illustrating a method for identifying audio content, in accordance with an embodiment of the disclosure.

FIG. 5 is a flowchart illustrating a method for accessing information associated with a sample of the background audio, in accordance with an embodiment of the disclosure. FIG. 5 is described in conjunction with elements of FIG. 1, FIG. 2, FIG. 3, and FIG. 4. The method 500 may be implemented in the computing device 102, communicatively coupled to the database server 104, and the server computing device 106.

The method 500 begins at step 502 and proceeds to step 504. At step 504, a sample of background audio in a vicinity of the computing device 102 may be recorded by the computing device 102. The sample of background audio may be recorded at predetermined time intervals.

At step 506, the recorded sample of background audio may be transmitted to the server computing device 106. The recorded sample of background audio and a metadata associated with the recorded sample of background audio may be stored at the server computing device 106.

At step 508, a user input may be received to access information associated with the recorded sample of background audio. The user input may include one or more identifiers associated with the metadata associated with the recorded sample of background audio. The information may be determined by the server computing device 106 based on the recorded sample of background audio.

At step 510, the information associated with the recorded sample of background audio may be received from the server computing device 106 in response to the received user input. Control then passes to end step 512.

Figure 6:
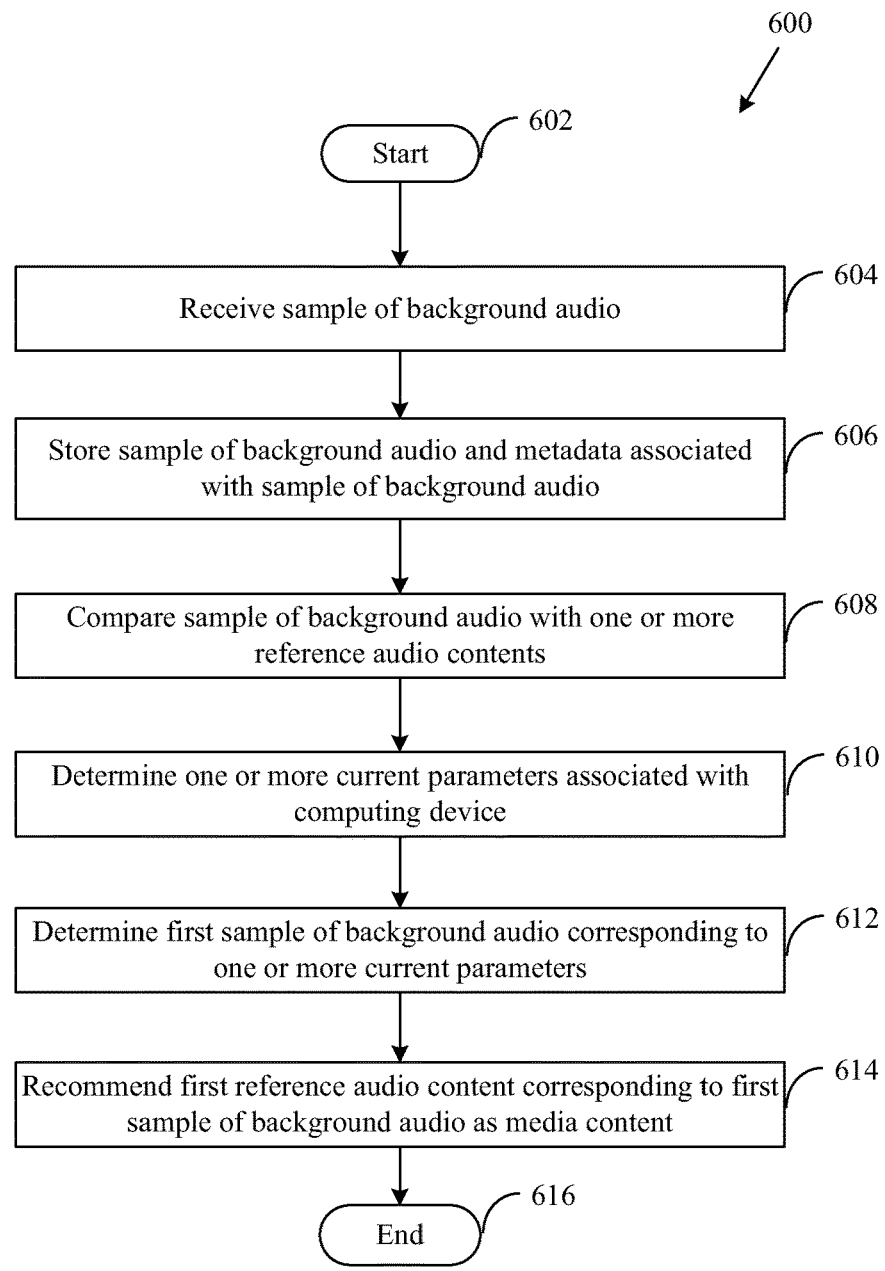
FIG. 6 is a flow chart illustrating a method for recommending media content, in accordance with an embodiment of the disclosure.

FIG. 6 is another flowchart illustrating a method for recommending media content, in accordance with an embodiment of the disclosure. FIG. 6 is described in conjunction with elements of FIG. 1, FIG. 2, FIG. 3, and FIG. 4. The method 600 may be implemented in the server computing device 106, communicatively coupled to the computing device 102, and the database server 104.

The method 600 begins at step 602 and proceeds to step 604. At step 604, a sample of background audio may be received from the computing device 102. The sample of background audio may be recorded in a vicinity of the computing device 102.

At step 606, the sample of background audio and a metadata associated with the sample of background audio may be stored in the server computing device 106.

At step 608, the sample of background audio may be compared with one or more reference audio contents. One of the one or more reference audio contents corresponding to the sample of background audio may be determined based on the comparison.

At step 610, one or more current parameters associated with the computing device 102 may be determined by the server computing device 106. At step 612, a first sample of background audio, stored in the server computing device 106, corresponding to the determined one or more current parameters may be determined by the server computing device 106.

At step 614, a first reference audio content which corresponds to the determined first sample of background audio may be recommended as the media content to the user 112. The media content may be recommended via the computing device 102. Control then passes to end step 616.

In accordance with another embodiment of the disclosure, the computing device 102 (FIG. 2) for accessing information associated with a sample of background audio is presented. Exemplary aspects of the disclosure may comprise one or more processors and/or circuits, such as the processor 202 (FIG. 2), in the computing device 102. The processor 202 may be operable to record, at predetermined time intervals, a sample of background audio in a vicinity of the computing device 102. The processor 202 may be operable to transmit the recorded sample of background audio to a server computing device 106 (FIG. 1). The recorded sample of background audio and a metadata associated with the recorded sample of background audio may be stored at the server computing device 106. The processor 202 may be operable to access information associated with the recorded sample of background audio from the server computing device 106. The information may be determined by the server computing device 106 based on the recorded sample of background audio.

In an embodiment, the recorded sample of background audio may be compared with one or more reference audio contents by the server computing device 106. In an embodiment, the one or more reference audio contents may include one or more of: music, songs, advertisements, movies, broadcast programs, live concerts, and/or combination thereof. In an embodiment, one of the one or more reference audio contents corresponding to the recorded sample of background audio may be determined based on the comparison. In an embodiment, information associated with the recorded sample of background audio may include one or more of: genre, title, artist, album, and/or a website corresponding to the one of the one or more reference audio contents. In an embodiment, the computing device 102 may include one or more audio sensors included in the sensing device 206 (FIG. 2), to detect the background audio.

In an embodiment, the metadata may include a first metadata transmitted from the computing device 102 to the server computing device 106, and a second metadata generated by the server computing device 106. In an embodiment, the first metadata may include one or more of: date, time, day of week, volume, location and/or surroundings associated with the recorded sample of background audio. In an embodiment, the second metadata may include date and/or time when the recorded sample of background audio is received by the server computing device 106.

The processor 202 may be operable to present a user interface, such as user interface 404 (FIG. 4A) on a display screen 402 (FIG. 4A) of the computing device 102 to receive a user input to access the information associated with the recorded sample of background audio. In an embodiment, the user input may include one or more identifiers associated with the first metadata. The processor 202 may be operable to receive the information associated with the recorded sample of background audio in response to the user input.

The processor 202 may be operable to transmit the recorded sample of background audio to the server computing device 106 when the computing device 102 is connected to a predetermined communication network 110 (FIG. 1). The processor 202 may be operable to store the recorded sample of background audio in the memory 204 (FIG. 2) when the computing device 102 is not connected to the predetermined communication network 110. In an embodiment, the computing device 102 may include one or more of: a cell phone device, a personal digital assistant, a Bluetooth headset device, and/or a recording device.

In accordance with another embodiment of the disclosure, the server computing device 106 (FIG. 1) for recommending media content to the user 112 (FIG. 1) associated with the computing device 102 (FIG. 1) is presented. Exemplary aspects of the disclosure may comprise the one or more processors and/or circuits, such as the processor 302 (FIG. 3), in the server computing device 106. The processor 302 may be operable to receive a sample of background audio from the computing device 102. The sample of background audio may be recorded in a vicinity of the computing device 102. The processor 302 may be operable to store the sample of background audio and a metadata associated with the sample of background audio in the memory 304 (FIG. 3). The processor 302 may be operable to recommend a media content to the user 112. The media content may be recommended based on the metadata associated with the sample of background audio.

The processor 302 may be operable to map the sample of background audio and the metadata to a user profile associated with the computing device 102 and/or the user 112 in a database in the memory 304. In an embodiment, the metadata may include one or more of: date, time, day of a week, volume, location, and/or surroundings associated with the sample of background audio. The processor 302 may be operable to compare the sample of background audio with one or more reference audio contents. In an embodiment, the one or more reference audio contents may include one or more of: music, songs, advertisements, movies, broadcast programs, live concerts, and/or combination thereof. The processor 302 may be operable to determine one of the one or more reference audio contents corresponding to the sample of background audio based on the comparison.

The processor 302 may be operable to determine one or more current parameters associated with the computing device 102. The one or more current parameters may include one or more of: current time, current day of week, and/or current location and/or surroundings. The processor 302 may be operable to determine a first sample of the background audio stored in the memory 304 corresponding to the one or more current parameters. The processor 302 may be operable to recommend a first reference audio content corresponding to the determined first sample of background audio as the media content.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer for accessing information associated with a sample of background audio. The at least one code section in a computing device may cause the machine and/or computer to perform the steps comprising recording, at predetermined time intervals, a sample of background audio in a vicinity of the computing device. The recorded sample of background audio may be transmitted to a server computing device. The recorded sample of background audio and a metadata associated with the recorded sample of background audio may be stored at the server computing device. Information associated with the recorded sample of background audio may be accessed from the server computing device. The information may be determined by the server computing device based on the recorded sample of background audio.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer for recommending media content to a user associated with a computing device. The at least one code section in a server computing device may cause the machine and/or computer to perform the steps comprising receiving a sample of background audio from the computing device. The sample of background audio may be recorded in a vicinity of the computing device. The sample of background audio and a metadata associated with the sample of background audio may be stored in the server computing device. A media content may be recommended to the user. The media content may be recommended based on the metadata associated with the sample of background audio.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system, comprising:
a computing device that comprises first circuitry; and
a server computing device that comprises second circuitry, wherein said first circuitry of said computing device is communicably coupled to said server computing device;
wherein said first circuitry of said computing device is configured to:
detect, by at least one audio sensor, a sample of background audio;
measure, by a sensing device, a magnitude of said sample of background audio;
determine whether said magnitude of said sample of background audio is greater than a threshold value;
record, at time intervals, said sample of background audio within a distance from which said computing device detects said sample of background audio, wherein said sample of background audio is recorded based on said determination that said magnitude of said sample of background audio is greater than said threshold value, wherein said threshold value is set based on a user input, and wherein said sample of background audio is recorded based on a power level of said computing device;
convert a first file format of said recorded sample of background audio to a second file format, wherein said second file format corresponds to at least one reference audio content that is stored on a database associated with said server computing device;
transmit said recorded sample of background audio in said second file format, and metadata associated with said recorded sample of background audio to said server computing device; and
wherein said second circuitry of said server computing device is configured to:
receive, from said computing device, said recorded sample of background audio in said second file format, and said metadata;
store said received sample of background audio and said metadata in said database;
filter said recorded sample of background audio to separate said recorded sample of background audio into a primary audio content and a secondary audio content, wherein said secondary audio content is used to identify surroundings of said computing device; and
determine information associated with said recorded sample of background audio based on at least one of said metadata or said identified surroundings;
wherein said first circuitry of said computing device is further configured to:
access said determined information associated with said recorded sample of background audio from said server computing device; and
display, by a display device coupled to said computing device, said accessed information associated with said recorded sample of background audio.

2. The system according to claim 1, wherein said second circuitry of said server computing device is further configured to compare said recorded sample of background audio in said second file format with said at least one reference audio content.

3. The system according to claim 2, wherein said at least one reference audio content comprises at least one of music, songs, advertisement, movies, broadcast programs, or live concerts.

4. The system according to claim 2, wherein said first circuitry of said server computing device is further configured to determine said at least one reference audio content that corresponds to said recorded sample of background audio based on said comparison.

5. The system according to claim 4, wherein said information associated with said recorded sample of background audio comprise at least one of genre, title, artist, album, or a website that corresponds to at least one reference audio content.

6. The system according to claim 1, wherein said computing device further comprises said at least one audio sensor.

7. The system according to claim 1, wherein said metadata comprises first metadata transmitted from said computing device to said server computing device and second metadata generated by said server computing device.

8. The system according to claim 7, wherein said first metadata comprises at least one of date, time, day of a week, volume, location or surroundings associated with said recorded sample of background audio.

9. The system according to claim 7, wherein said second metadata comprises at least one of date or time based on said reception of said recorded sample of background audio by said server computing device.

10. The system according to claim 1, wherein said first circuitry of said computing device is further configured to display a user interface, said user interface is configured to receive said user input to access said information associated with said recorded sample of background audio.

11. The system according to claim 10, wherein said user input comprises at least an identifier associated with said metadata.

12. The system according to claim 10, wherein said first circuitry of said computing device is further configured to receive said information associated with said recorded sample of background audio based on said user input.

13. The system according to claim 1, wherein said first circuitry of said computing device is further configured to transmit said recorded sample of background audio to said server computing device based on a connection of said computing device to a communication network.

14. The system according to claim 13, wherein said first circuitry of said computing device is further configured to store said recorded sample of background audio in a local storage device associated with said computing device based on an inability to connect to said communication network.

15. The system according to claim 1, wherein said computing device is one of a cell phone device, a microphone device, a personal digital assistant, a bluetooth headset device or a recording device.

16. A system, comprising:
a computing device that comprises first circuitry; and
a server computing device that comprises second circuitry, wherein said first circuitry of said computing device is communicably coupled to said server computing device;
wherein said first circuitry of said computing device is configured to:
detect, by an audio sensor, a sample of background audio;
measure, by a sensing device, a magnitude of said sample of background audio;
determine whether said magnitude of said sample of background audio is greater than a threshold value;
record said sample of background audio within a distance from which said computing device detects said sample of background audio,
wherein said sample of background audio is recorded based on said determination that said magnitude of said sample of background audio is greater than said threshold value, wherein said threshold value is set based on a user input, and wherein said sample of background audio is recorded based on a power level of said computing device; and
convert a first file format of said sample of background audio to a second file format, wherein said second file format corresponds to at least one reference audio content that is stored on a database associated with said server computing device;
wherein said second circuitry of said server computing device is configured to:
receive, from said computing device, said recorded sample of background audio in said second file format and metadata associated with said recorded sample of background audio;
store said received sample of background audio in said second file format and metadata associated with said sample of background audio in said database;
determine a primary audio content and a secondary audio content in said sample of background audio, wherein said secondary audio content is used to identify surroundings of said computing device;
generate a media content based on said secondary audio content and said metadata; and
transmit, to said computing device, said generated media content;
wherein said first circuitry of said computing device is further configured to:
display said media content.

17. The system according to claim 16, wherein said first circuitry of said computing device is further configured to map said sample of background audio and said metadata to a user profile associated with at least one of said computing device or a user in said database associated with said server computing device.

18. The system according to claim 16, wherein said metadata comprises at least one of date, time, day of a week, volume, location or surroundings associated with said sample of background audio.

19. The system according to claim 16, wherein said first circuitry of said computing device is further configured to compare said sample of background audio with said at least one reference audio content.

20. The system according to claim 19, wherein said at least one reference audio content comprises at least one of music, songs, advertisement, movies, broadcast programs, or live concerts.

21. The system according to claim 19, wherein said first circuitry of said computing device is further configured to determine said at least one reference audio content that corresponds to said sample of background audio based on said comparison.

22. The system according to claim 21, wherein said first circuitry of said computing device is further configured to determine at least one parameter, wherein said at least one parameter comprises at least one of time, a day of week, a location of said computing device, or said surroundings associated with said computing device.

23. The system according to claim 22, wherein said first circuitry of said computing device is further configured to determine a first sample of background audio, stored in said server computing device, that corresponds to said at least one parameter.

24. The system according to claim 23, wherein said first circuitry of said computing device is further configured to output, to said computing device, first reference audio content that corresponds to said first sample of background audio as said media content.

25. A method, comprising:
detecting, by a computing device, a sample of background audio;
measuring, by said computing device, a magnitude of said sample of background audio;

determining, by said computing device, whether said magnitude of said sample of background audio is greater than a threshold value;
recording by said computing device, at time intervals, said sample of background audio within a distance from which said computing device detects said sample of background audio,
wherein said sample of background audio is recorded based on said determination that said magnitude of said sample of background audio is greater than said threshold value, wherein said threshold value is set based on a user input, and wherein said sample of background audio is recorded based on a power level of said computing device;
converting, by said computing device, a first file format of said recorded sample of background audio to a second file format, wherein said second file format corresponds to at least one reference audio content that is stored on a database associated with a server computing device;
transmitting, by said computing device, said recorded sample of background audio in said second file format, and metadata associated with said recorded sample of background audio to said server computing device;
receiving, by said server computing device, said recorded sample of background audio in said second file format, and said metadata from said computing device;
storing, by said server computing device, said received sample of background audio and said metadata in said database;
filtering said recorded sample of background audio to separate said recorded sample of background audio into a primary audio content and a secondary audio content, wherein said secondary audio content is used to identify surroundings of said computing device;
determining, by said server computing device, information associated with said recorded sample of background audio based on at least one of said metadata or said identified surroundings;
accessing, by said computing device, said determined information associated with said recorded sample of background audio from said server computing device; and
displaying, by said computing device, said accessed information associated with said recorded sample of background audio.

26. A method, comprising:
detecting, by a computing device, a sample of background audio;
measuring, by said computing device, a magnitude of said sample of background audio;
determining, by said computing device, whether said magnitude of said sample of background audio is greater than a threshold value;
recording, by said computing device, said sample of background audio within a distance from which said computing device detects said sample of background audio,
wherein said sample of background audio is recorded based on said determination that said magnitude of said sample of background audio is greater than said threshold value, wherein said threshold value is set based on a user input, and wherein said sample of background audio is recorded based on a power level of said computing device;
converting, by said computing device, a first file format of said sample of background audio to a second file format, wherein said second file format corresponds to at least one reference audio content that is stored on a database associated with a server computing device;
receiving, by said server computing device, said recorded sample of background audio in said second file format, and metadata associated with said recorded sample of background audio, from said computing device;
storing, in said server computing device, said sample of background audio in said second file format and metadata associated with said sample of background audio;
determining, by said server computing device, a primary audio content and a secondary audio content in said sample of background audio, wherein said secondary audio content is used to identify surroundings of said computing device;
generating, by said server computing device, a media content based on said secondary audio content and said metadata;
transmitting, by said server computing device, said generated media content to said computing device; and
displaying, said media content, on said computing device.

* * * * *